United States Patent
Zhou et al.

(10) Patent No.: US 11,611,870 B2
(45) Date of Patent: Mar. 21, 2023

(54) UE CAPABILITY REPORTING FOR CONFIGURED AND ACTIVATED PATHLOSS REFERENCE SIGNALS

(71) Applicant: QUALCOMM Incorporated, San Diego, CA (US)

(72) Inventors: Yan Zhou, San Diego, CA (US); Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/096,844

(22) Filed: Nov. 12, 2020

(65) Prior Publication Data

US 2021/0153003 A1    May 20, 2021

Related U.S. Application Data

(60) Provisional application No. 62/938,131, filed on Nov. 20, 2019.

(51) Int. Cl.
*H04W 8/24*  (2009.01)
*H04W 52/24* (2009.01)
(Continued)

(52) U.S. Cl.
CPC ............ *H04W 8/24* (2013.01); *H04L 5/0051* (2013.01); *H04L 25/0226* (2013.01); *H04W 52/242* (2013.01); *H04W 72/0413* (2013.01)

(58) Field of Classification Search
None
See application file for complete search history.

(56) References Cited

U.S. PATENT DOCUMENTS 11,109,323 B2 *  8/2021  Gao ................... H04W 52/04
11,191,031 B2 * 11/2021  Ryu .................. H04W 72/0413
(Continued)

OTHER PUBLICATIONS

3GPP: "3rd Generation Partnership Project; Technical Specification Group Radio Access Network; NR; Radio Resource Control (RRC) Protocol Specification (Release 15)", 3GPP Draft; 38331-F51, 3rd Generation Partnership Project (3GPP), Mobile Competence Centre; 650, Route Des Lucioles; F-06921 Sophia-Antipolis Cedex; France, Apr. 16, 2019 (Apr. 16, 2019), XP051698589, From Internet: URL: http://www.3gpp.org/ftp/3guInternal/3GPP%5Fultimate%5Fversions%5Fto%5Fbe%5Ftransposed/sentToDpc/38331%2Df51%2Ezip [retrieved on Apr. 16, 2019] p. 282.

(Continued)

*Primary Examiner* — Otis L Thompson, Jr.
(74) *Attorney, Agent, or Firm* — Procopio, Cory, Hargreaves & Savitch LLP

(57) ABSTRACT

A user equipment (UE) transmits, to a base station, UE capability information that corresponds to a maximum number of configured pathloss reference signals and/or a maximum number of activated pathloss reference signals. Then, the base station configures the UE for a number of configured pathloss reference signals that is less than or equal to the maximum number of configured pathloss references signals and/or activates a number of pathloss reference signals based on the UE capability information that is less than or equal to the maximum number of activated pathloss references signals.

30 Claims, 10 Drawing Sheets

(51) Int. Cl.
*H04L 25/02* (2006.01)
*H04W 72/04* (2023.01)
*H04L 5/00* (2006.01)

(56) References Cited

U.S. PATENT DOCUMENTS

| | | | | |
|---|---|---|---|---|
| 2004/0219943 | A1* | 11/2004 | Terry | H04W 72/085 |
| | | | | 455/522 |
| 2018/0324716 | A1* | 11/2018 | Jeon | H04W 52/367 |
| 2018/0324853 | A1 | 11/2018 | Jeon et al. | |
| 2019/0081753 | A1* | 3/2019 | Jung | H04L 1/1854 |
| 2019/0141742 | A1 | 5/2019 | Zhou et al. | |
| 2019/0215781 | A1 | 7/2019 | Jeon et al. | |
| 2019/0312668 | A1 | 10/2019 | Park et al. | |
| 2019/0349867 | A1 | 11/2019 | Molavianjazi et al. | |
| 2019/0373563 | A1* | 12/2019 | Gong | H04B 17/327 |
| 2021/0029650 | A1* | 1/2021 | Cirik | H04W 52/248 |
| 2021/0143922 | A1* | 5/2021 | Jin | H04W 52/54 |
| 2022/0116882 | A1* | 4/2022 | Guo | H04W 52/146 |
| 2022/0124630 | A1* | 4/2022 | You | H04W 52/242 |
| 2022/0200764 | A1* | 6/2022 | You | H04L 5/0048 |
| 2022/0279450 | A1* | 9/2022 | Zhang | H04W 52/367 |

OTHER PUBLICATIONS

3GPP TS 38.306: "5G; NR; User Equipment (UE) Radio Access Capabilities (3GPP TS 38.306 Version 15.7.0 Release 15)", ETSI Technical Specification, European Telecommunications Standards Institute (ETSI), 650, Route Des Lucioles; F-06921 Sophia-Antipolis; France, vol. 3GPP RAN, No. V15.7.0, Oct. 15, 2019 (Oct. 15, 2019), pp. 1-57, XP014356036, Retrieved from the Internet: URL: http://www.etsi.org/deliver/etsi_ts/138300_138399/138306/15.07.00_60/ts_138306v150700p.pdf [retrieved on Oct. 15, 2019] 4.2, 4.2.7.2.

3GPP TS 38.321: "3rd Generation Partnership Project; Technical Specification Group Radio Access Network; NR; Medium Access Control (MAC) Protocol Specification (Release 15)"; V15.5.0 (Mar. 2019), 38321-F50, 3rd Generation Partnership Project (3GPP), Mobile Competence Centre; 650, Route Des Lucioles; F-06921 Sophia-Antipolis Cedex; France, Apr. 9, 2019, pp. 1-78, XP051698585, URL: http://www.3gpp.org/ftp/3guInternal/3GPP%5Fultimate%5Fversions%5Fto%5Fbe%5Ftransposed/sentToDpc/38321%2Df50%2Ezip [retrieved on Apr. 9, 2019] 5.6, 6.1.3.17.

International Search Report and Written Opinion—PCT/US2020/060611—ISA/EPO—dated Feb. 16, 2021.

* cited by examiner

UE CAPABILITY REPORTING FOR CONFIGURED AND ACTIVATED PATHLOSS REFERENCE SIGNALS

CROSS REFERENCE TO RELATED APPLICATION(S)

This application claims the benefit of U.S. Provisional Application Ser. No. 62/938,131, entitled "UE Capability Reporting for Configured and Activated Pathloss Reference Signals" and filed on Nov. 20, 2019, which is expressly incorporated by reference herein in its entirety.

BACKGROUND

Technical Field

The present disclosure relates generally to communication systems, and more particularly, to wireless communication including a pathloss reference signal.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A set of pathloss reference signals may be configured for a user equipment (UE). Then, pathloss reference signals from the set of configured pathloss reference signals may be activated for the UE for performing power control. The UE may perform layer 3 (L3) filtering per activated pathloss reference signal to determine a more stable pathloss value for uplink power control. Aspects of the present disclosure improve the configuration and activation of pathloss reference signals through the UE reporting its capability for a maximum number of configured pathloss reference signals and/or a maximum number of activated pathloss reference signals.

In an aspect of the disclosure, a method, a computer-readable medium, and an apparatus are provided for wireless communication at a UE. The apparatus transmits, to a base station, UE capability information that corresponds to at least one of a first maximum number of configured pathloss reference signals or a second maximum number of activated pathloss reference signals. Then, the UE receives a configuration from the base station for at least one of configured pathloss reference signals or activated pathloss reference signals based on the UE capability information.

In an aspect of the disclosure, a method, a computer-readable medium, and an apparatus are provided for wireless communication at a base station. The apparatus receives, from a UE, UE capability information for at least one of a first maximum number of configured pathloss reference signals or a second maximum number of activated pathloss reference signals. Then, the base station configures the UE for at least one of a third number of configured pathloss reference signals or a fourth number of activated pathloss reference signals based on the UE capability information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
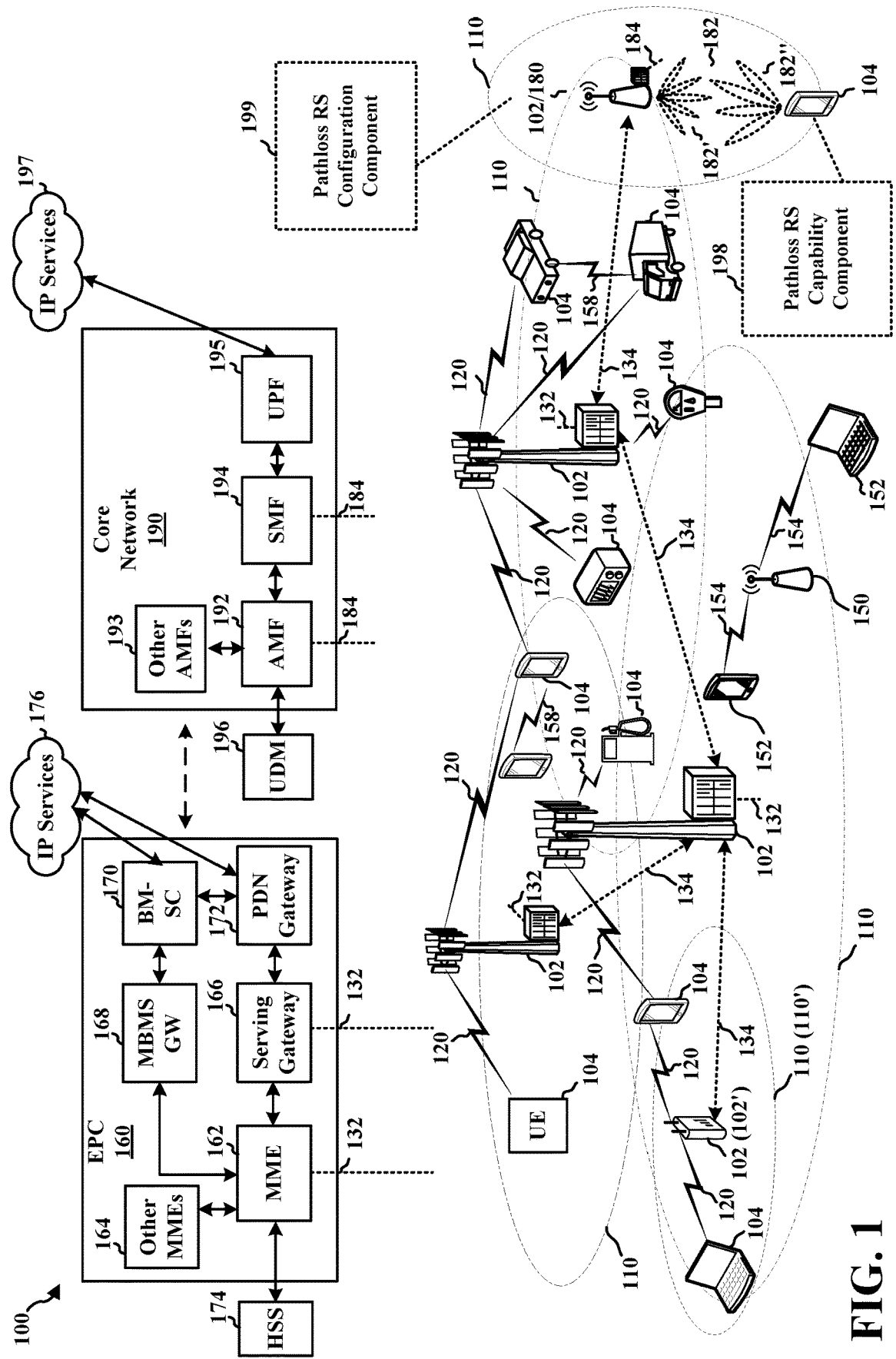
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A set of pathloss reference signals may be configured for a user equipment (UE). Then, pathloss reference signals from the set of configured pathloss reference signals may be activated for the UE for performing power control. The UE may perform layer 3 (L3) filtering per activated pathloss reference signal to determine a more stable pathloss value for uplink power control. Aspects of the present disclosure improve the configuration and activation of pathloss reference signals through the UE reporting its capability for a maximum number of configured pathloss reference signals and/or a maximum number of activated pathloss reference signals.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a pathloss reference signal capability component 198 configured to transmit, to the base station 102/180, UE capability information that corresponds to a maximum number of configured pathloss reference signals and/or a maximum number of activated pathloss reference signals. The base station 102/180 may include a pathloss reference signal configuration component 199 configured to receive the UE capability information from the UE 104 and to configure the UE 104 for a number of configured pathloss reference signals and/or number of activated pathloss reference signals based on the UE capability. Although the following description may be focused on 5G NR, the concepts described herein may be applicable to other similar areas, such as LTE, LTE-A, CDMA, GSM, and other wireless technologies.

Figure 2:
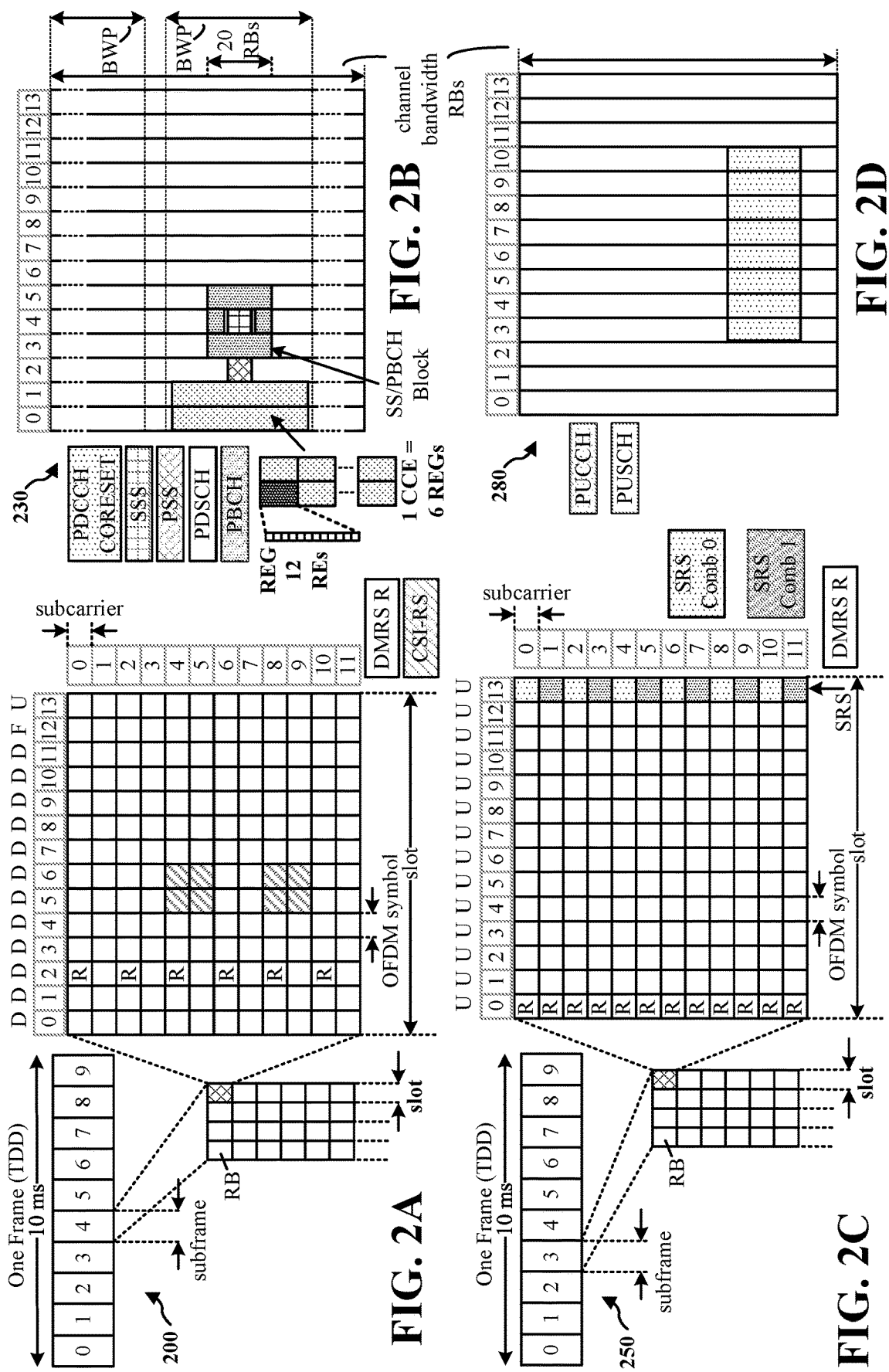
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
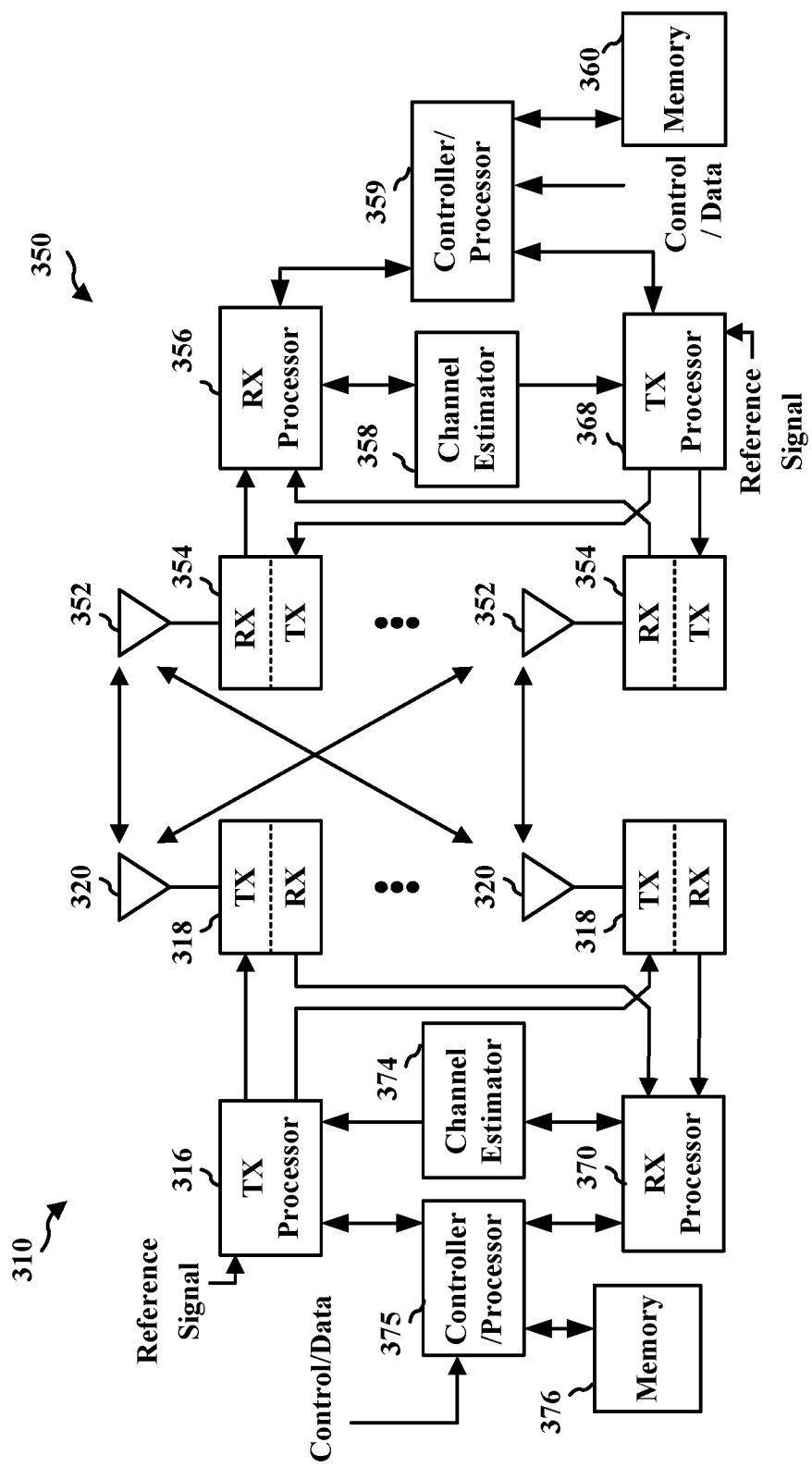
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Communication between a base station and a UE may need to adapt to variations of a wireless channel. One adaptation may include power control. For example, a UE may adjust the transmission power based on a channel quality. Power control may be applied by a base station for downlink transmissions and by a UE for uplink transmissions. As an example, if there is a good channel quality, the UE may use a lower transmission power, which may reduce interference caused by the uplink transmission and reduce UE power consumption. Power control may be applied by the UE to determine a transmission power that may help avoid interference and reduce power consumption while also helping to ensure that uplink transmissions may be accurately received by a base station. A UE may increase the uplink transmission power to compensate for a pathloss increase. The UE may measure a reference signal, such as a pathloss reference signal, that the UE receives from the base station. The UE may use the measurement, along with other factors, to determine a transmission power for uplink transmissions from the UE.

The base station may configure pathloss reference signals for the UE to use for power control associated with an uplink signal of the UE, an uplink channel of the UE, etc. For example, pathloss reference signals may be configured for the UE for use in power control for a sounding reference signal (SRS), a PUSCH, and/or a PUCCH.

The base station may update the pathloss reference signals per SRS resource set, e.g., in a medium access control-control element (MAC-CE). For example, a base station may use RRC signaling to configure a set of pathloss reference signals for SRS at the UE. Then, the base station may activate a pathloss reference signal per SRS resource set (e.g., in a MAC-CE), each activated pathloss reference signal being from the configured set of pathloss reference signals. Thus, updating the pathloss reference signals may refer to activation of one or more pathloss reference signals from the configured set of pathloss reference signals. The configured set of pathloss reference signals may be referred to as a configured pathloss reference signal pool.

A UE may perform L3 filtering per activated pathloss reference signal. The L3 filtering may help the UE to determine a more stable pathloss value for the SRS power control. As an example, L3 filtering may include performing a filtering function on the measurements of the activated pathloss reference signals and before using the measurements for to determine a transmit power for an uplink transmission. As one, non-limiting example, the UE may apply the formula $F_n=(1-\alpha)*F_{n-1}+\alpha*M_n$ for L3 filtering of the pathloss reference signal measurement. In the example formula, $M_n$ is the latest received measurement result from the physical layer, $F_n$ is the updated filtered measurement result, that is used for evaluation of reporting criteria or for measurement reporting. $F_{n-1}$ is the older filtered measurement result, where $F_0$ is set to $M_1$ when the first measurement result from the physical layer is received; and for a measurement object (e.g., MeasObjectNR), $\alpha=\frac{1}{2}^{(ki/4)}$, where k is the filter coefficient (e.g., filterCoefficient) for the corresponding measurement quantity of the i:th Quantity-ConfigNR in quantityConfigNR-List, and i is indicated by quantityConfigIndex in MeasObjectNR; for other measurements, $\alpha=\frac{1}{2}^{(k/4)}$, where k is the filter Coefficient for the corresponding measurement quantity received by the quantityConfig; for UTRA-FDD, $\alpha=\frac{1}{2}^{(k/4)}$, where k is the filter Coefficient for the corresponding measurement quantity received by a configured quantity (e.g., quantityConfigUTRA-FDD in the QuantityConfig). The UE may adapt the filter such that the time characteristics of the filter are preserved at different input rates, e.g., observing that the filter Coefficient k assumes a sample rate equal to X ms. The value of X may be equivalent to one intra-frequency L1 measurement period. The value may be a defined value as defined, e.g., assuming non-DRX operation, and may depend on a frequency range.

The SRS may include an aperiodic SRS (AP-SRS) and/or a semi-persistent SRS (SP-SRS). A base station may transmit a MAC-CE that updates the pathloss reference signal(s) for AP-SRS/SP-SRS for a UE.

The UE may be configured with multiple pathloss reference signals by RRC signaling from the base station and one of the configured pathloss reference signals may be activated/updated by a MAC-CE for a particular SRS resource set.

The base station may update pathloss reference signals per SRS resource indicator (SRI) associated with a PUSCH transmission using a MAC-CE. For example, the base station may use RRC signaling to configure a set of pathloss reference signals for the UE. Then, the base station may activate a pathloss reference signal per SRI, each activated pathloss reference signal being from the configured set of pathloss reference signals. The UE may perform L3 filtering per activated pathloss reference signal. The L3 filtering may help the UE to determine a more stable pathloss value for the PUSCH power control. Thus, a MAC-CE message from the base station may activate/update a value of a PUSCH pathloss reference signal identifier (ID) (which may be referred to, e.g., by a parameter such as "PUSCH-Pathloss-ReferenceRS-Id"). The PUSCH pathloss reference signal ID may correspond to an SRI PUSCH power control ID (which may be referred to, e.g., by a parameter such as "sri-PUSCH-powercontrolId"). A mapping may be given by SRI PUSCH power control having a link between the SRI PUSCH power control ID and a PUSCH pathloss reference signal ID.

A higher layer filtered reference signal received power (RSRP) may be used for a pathloss measurement. A time following the MAC-CE may be provided for the UE to perform the pathloss measurement. For example, a filtered RSRP value for the previous pathloss reference signal may be used until a particular time, which may be referred to as an application time. For example, the application time may be the next slot after a fifth measurement sample, where the first measurement sample corresponds to the first instance of the pathloss reference signal. The first instance of the pathloss reference signal may be, e.g., 3 ms after the UE sends an ACK in response to receiving the MAC-CE that activates the pathloss reference signal.

The activation, via MAC-CE, of configured pathloss reference signals may be applicable for UEs supporting more than four RRC-configurable pathloss reference signals and may be applicable when a pathloss reference signal that is activated by the MAC-CE is not tracked by the UE. In some examples, the UE may track the activated pathloss reference signal(s) if more than four pathloss reference signals are configured in RRC signaling from the base station. The UE may determine whether to update filtered RSRP values for a previous pathloss reference signal, e.g., 3 ms after sending the ACK in response to the MAC-CE that activates the new pathloss reference signal.

The UE may need memory in order to store the configured pathloss reference signals at the UE. Additionally, the UE may need hardware and/or software resources to perform L3 filtering per activated pathloss reference signal. In order to provide for a configuration/activation of pathloss reference signals that are within the UE's capabilities, aspects of the present disclosure include the UE reporting capability information to the base station indicating a maximum number of configured pathloss reference signals supported by the UE and/or a maximum number of activated pathloss reference signals supported by the UE.

Figure 4:
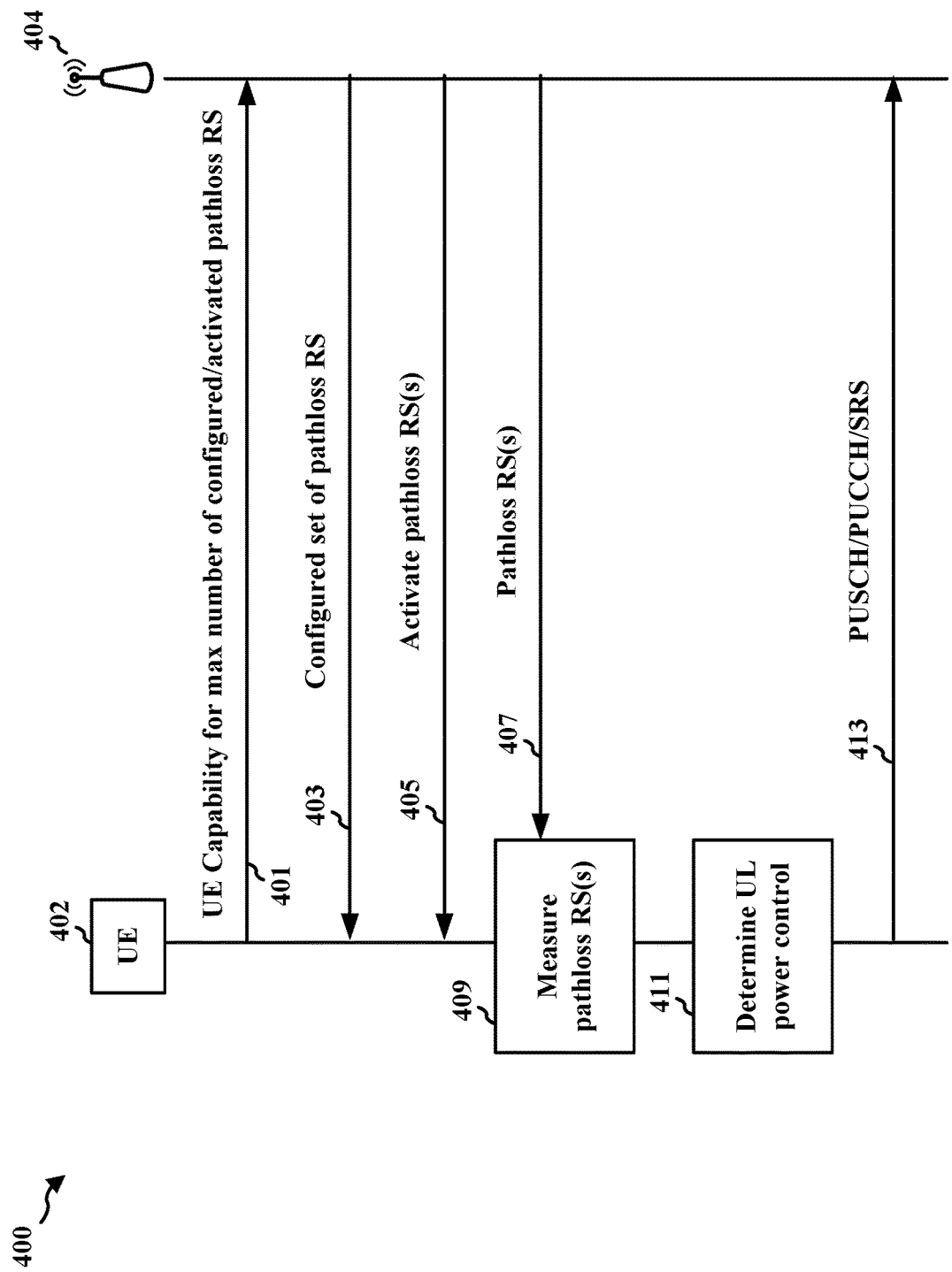
FIG. 4 illustrates an example communication flow between a UE and a base station including UE capability signaling about pathloss reference signals.

FIG. 4 illustrates an example communication flow 400 between a UE 402 and a base station 404. At 401, the UE 402 reports, or otherwise indicates, to the base station 404 information about a UE capability including a maximum number of configured pathloss reference signals supported by the UE 402 and/or a maximum number of activated pathloss reference signals supported by the UE 402. The UE 402 may indicate the capability information via a PUCCH. The maximum number of activated pathloss reference signals may be equal to or less than the maximum number of configured pathloss reference signals. For example, the maximum number of configured pathloss reference signals may have a candidate value of 2, 4, 8, 16, 32, . . . , 64, 128, etc. The maximum number of activated pathloss reference signals may have a candidate value of 2, 4, 8, 16, etc. and may be no more than the reported maximum number of configured pathloss reference signals supported by the UE. The UE may provide information about the UE capability that is based on memory, hardware and/or software at the UE 402. For example, the UE capability may be based on an amount of memory for storing configuration information for configured pathloss reference signals. The UE may provide information about the UE capability that is based on hardware or software for performing L3 filtering of activated pathloss reference signals. The information about the UE capability may be for power control of one or more uplink signals or uplink channels, such as a PUSCH, a PUCCH, and/or an SRS. For example, the UE capability information sent to the BS may correspond to a particular type of uplink transmission or a type of uplink channel. For example, the UE capability may be for power control of a single uplink signal or a single uplink channel. Alternatively, the information about the UE capability may apply to power control for each uplink signal from the UE 402 or for each uplink channel from the UE 402. Thus, rather than the UE providing information about a UE capability for a particular uplink signal or a particular uplink channel, the UE may provide information about a UE capability that applies to each uplink signal/channel from the UE (e.g., to power control for each uplink channel/signal).

At 403, the base station 404 may configure the UE 402 for a number of configured pathloss reference signals that is based on the received information about the UE capability, e.g., may be limited to be no more than the maximum number of configured pathloss reference signals indicated by the UE. Therefore, the base station 404 may configure a number of pathloss reference signals that is within the capability of the UE 402. The pathloss reference signals may be configured via RRC signaling from the base station 404.

At 405, the base station 404 may activate a number of pathloss reference signals based on the information about the UE capability. The base station may limit the number of activated pathloss reference signals to no more than the second maximum number of activated pathloss reference signals from the UE capability. Therefore, the base station 404 may activate a number of pathloss reference signals that is within the capability of the UE 402. The pathloss reference signal(s) may be activated via a MAC-CE from the base station 404.

As illustrated at 407, the base station 404 may transmit one or more pathloss reference signals corresponding to the activated pathloss reference signals. The UE 402 may measure the received pathloss reference signals, as illustrated at 409. The UE may determine a pathloss based on the measurement. The measurement, at 409, and/or the determination of the pathloss may include L3 filtering per activated pathloss reference signal. At 411, the UE may determine a transmit power for an uplink transmission based on a pathloss determined from the pathloss reference signal(s) 407.

Then, at 413, the UE 402 may transmit an uplink transmission such as PUSCH, PUCCH, and/or SRS using a transmit power determined, at 411, based on the pathloss from the activated pathloss reference signal 407.

Therefore, for a UE that supports MAC-CE dynamically updating pathloss reference signals for uplink power control, the UE may report its capabilities regarding pathloss reference signals. The base station may use the report of the UE capabilities to configure/activate an amount of pathloss reference signals that is within the capabilities of the UE.

Figure 5:
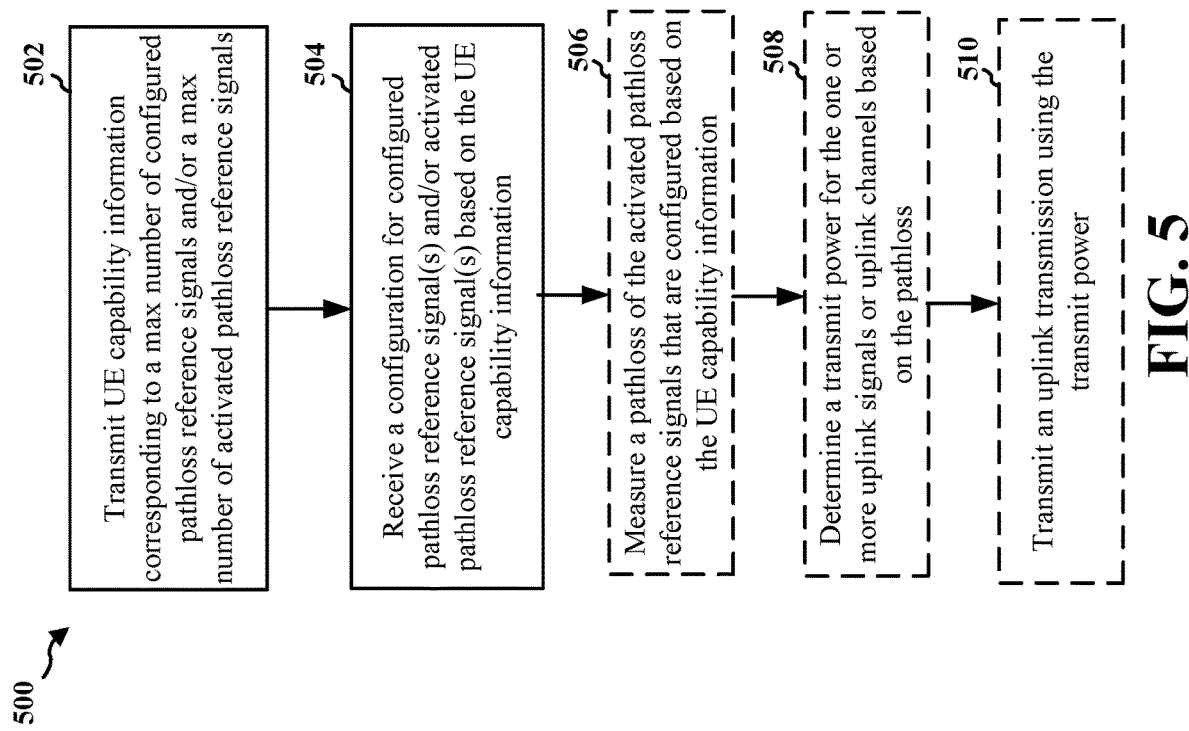
FIG. 5 is a flowchart of a method of wireless communication.

FIG. 5 is a flowchart 500 of a method of wireless communication. The method may be performed by a UE or a component of a UE (e.g., the UE 104, 350, 402; the apparatus 602/702; the cellular baseband processor 704, which may include the memory 360 and which may be the entire UE 350 or a component of the UE 350, such as the TX processor 368, the RX processor 356, and/or the controller/processor 359). The method may assist the UE by providing for a configuration/activation of pathloss reference signals that are within the UE's capabilities.

At 502, the UE transmits, to a base station, UE capability information that corresponds to a first maximum number of configured pathloss reference signals and/or a second maximum number of activated pathloss reference signals. The transmission may be performed, e.g., by the capability component 608 of the apparatus 602 in FIG. 6. The maximum number of activated pathloss reference signals may be equal to or less than the maximum number of configured pathloss reference signals. The UE capability information may be based on memory, hardware and/or software at the UE. For example, the UE capability information may be based on an amount of memory for storing configuration information for configured pathloss reference signals. The UE capability information may be based on hardware or software for performing L3 filtering of activated pathloss reference signals. The UE capability information for the first maximum number of configured pathloss reference signals or the second maximum number of activated pathloss reference signals may correspond to pathloss reference signals that the UE uses for power control of one or more uplink signals or uplink channels, such as a PUSCH, a PUCCH, and/or an SRS. For example, as described in connection with 806, 808, and 810, the UE may measure a pathloss of activated pathloss reference signals and may determine a transmit power for one or more uplink signals or uplink channels based on the measured pathloss. For example, the UE capability information may be for a particular type of uplink transmission or a type of uplink channel. The UE capability information may be for power control of a single uplink signal or a single uplink channel. Alternatively, the UE capability information may apply to power control for each uplink signal from the UE or for each uplink channel from the UE.

At 504, the UE receives a configuration from the base station for at least one of configured pathloss reference signals and/or activated pathloss reference signals based on the UE capability information. The reception may be performed, e.g., by the pathloss reference signal component 610 of the apparatus 602 in FIG. 6. The configuration of the pathloss reference signals may be received via RRC signaling from the base station. The activation of pathloss reference signals may be received in a MAC-CE from the base station.

As illustrated at 506, the UE may measure a pathloss of the activated pathloss reference signals that are configured based on the UE capability. For example, the UE capability information, provided at 502, for the first maximum number of configured pathloss reference signals or the second maximum number of activated pathloss reference signals may correspond to pathloss reference signals that the UE uses for power control of a single uplink signal or a single uplink channel, and the UE may determine, at 508, the transmit power for the single uplink signal or the single uplink channel based on the pathloss of the activated pathloss reference signals that are configured based on the UE capability. The measurement may be performed, e.g., by the measurement component 612 of the apparatus 602 or 702. The single uplink channel may be a PUCCH, PUSCH, or SRS, for example. In another example, the UE capability information for the first maximum number of configured pathloss reference signals or the second maximum number of activated pathloss reference signals may correspond to pathloss reference signals that the UE uses for power control for each uplink signal or for each uplink channel from the UE, and, at 508, the UE may determine the transmit power for each uplink signal or each uplink channel based on the pathloss of the activated pathloss reference signals that are configured based on the UE capability.

As illustrated at 508, the UE may determine a transmit power for the one or more uplink signals or uplink channels based on the pathloss. The determination may be performed, e.g., by the power control component 614 of the apparatus 602 or 702 based on the pathloss measurements from the measurement component 612. Then, at 510, the UE may transmit an uplink transmission using the transmit power determined at 508. The transmission may be performed, e.g., by the transmission component 606 of the apparatus 602 or 702 based on the transmit power received from the power control component 614.

Figure 6:
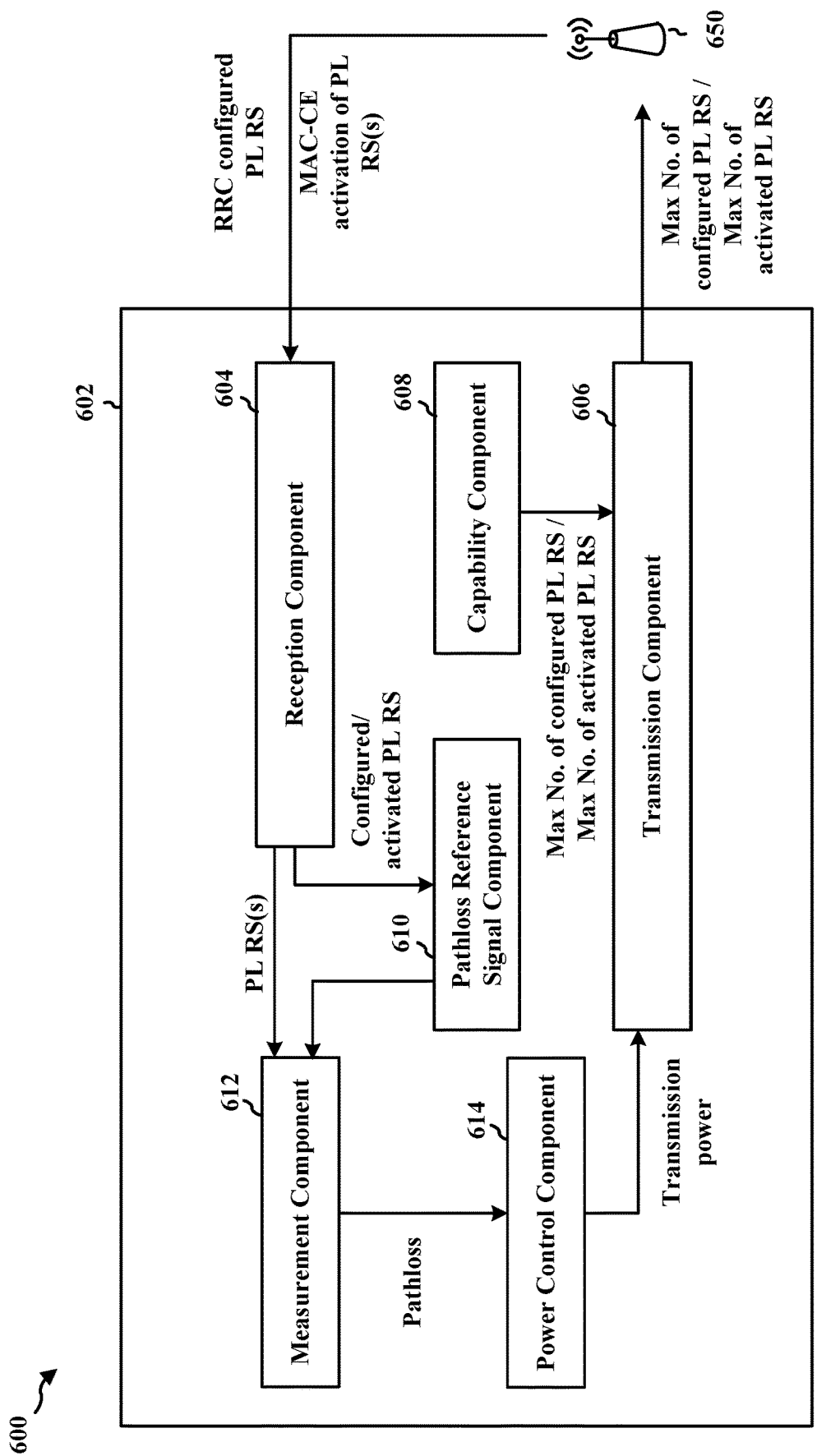
FIG. 6 is a conceptual data flow diagram illustrating the data flow between different means/components in an example apparatus.

FIG. 6 is a conceptual data flow diagram 600 illustrating the data flow between different means/components in an example apparatus 602. The apparatus may be a UE or a component of a UE. The apparatus 602 includes a reception component 604 configured to receive downlink communication from a base station 650 and a transmission component 606 configured to transmit uplink communication to the base station 650. The apparatus 602 includes a capability component 608 configured to transmit, to a base station, UE capability information that corresponds to at least one of a first maximum number of configured pathloss reference signals or a second maximum number of activated pathloss reference signals, e.g., as described in connection with 502 in FIG. 5. The apparatus includes a pathloss reference signal component 610 configured to receive a configuration from the base station 650 for at least one of configured pathloss reference signals or activated pathloss reference signals based on the UE capability information, e.g., as described in connection with 504 in FIG. 5. The apparatus may include a measurement component 612 configured to perform measurement of the activated pathloss reference signal(s), e.g., in order to determine a pathloss between the UE and the base station. The apparatus may include a power control component 614 configured to perform power control for uplink transmissions based on the pathloss.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
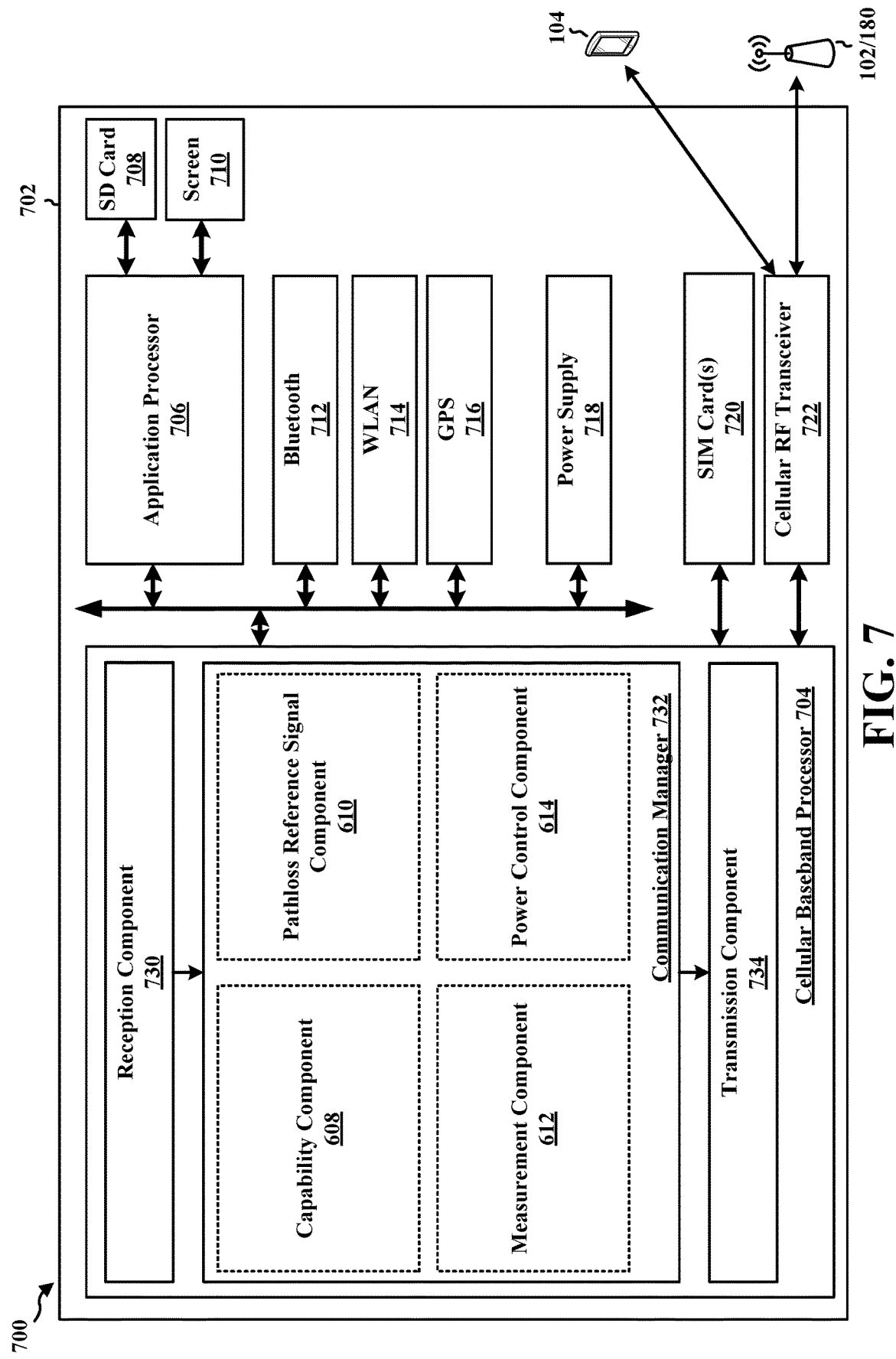
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/memory. The computer-readable medium/memory may be non-transitory. The cellular baseband processor 704 is responsible for general processing, including the execution of software stored on the computer-readable medium/memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the baseband processor 704, and in another configuration, the apparatus 702 may be the entire UE (e.g., see 350 of FIG. 3) and include the additional modules of the apparatus 702.

The communication manager 732 includes a capability component 608 that is configured to transmit, to a base station, a UE capability for at least one of a first maximum number of configured pathloss reference signals or a second maximum number of activated pathloss reference signals, e.g., as described in connection with 502 in FIG. 5. The communication manager 732 further includes a pathloss reference signal component 610 that is configured to receive a configuration from the base station 650 for at least one of configured pathloss reference signals or activated pathloss reference signals based on the UE capability, e.g., as described in connection with 504 in FIG. 5. The communication manager 732 further includes a measurement component 612 that is configured to perform measurement of the activated pathloss reference signal(s), e.g., in order to determine a pathloss between the UE and the base station. The communication manager 732 further includes a power control component 614 that is configured to perform power control for uplink transmissions based on the pathloss.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602/702, and in particular the cellular baseband processor 704, includes means for transmitting, to a base station, a UE capability for at least one of a first maximum number of configured pathloss reference signals or a second maximum number of activated pathloss reference signals. The apparatus includes means for receiving a configuration from the base station for at least one of configured pathloss reference signals or activated pathloss reference signals based on the UE capability. The apparatus may further include means for performing power control for uplink transmission based on the pathloss reference signal(s). The apparatus may further include means for measuring the activated pathloss reference signal(s). The apparatus may further include means for transmitting an uplink transmission using a transmission power based on a pathloss determined from the pathloss reference signal. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
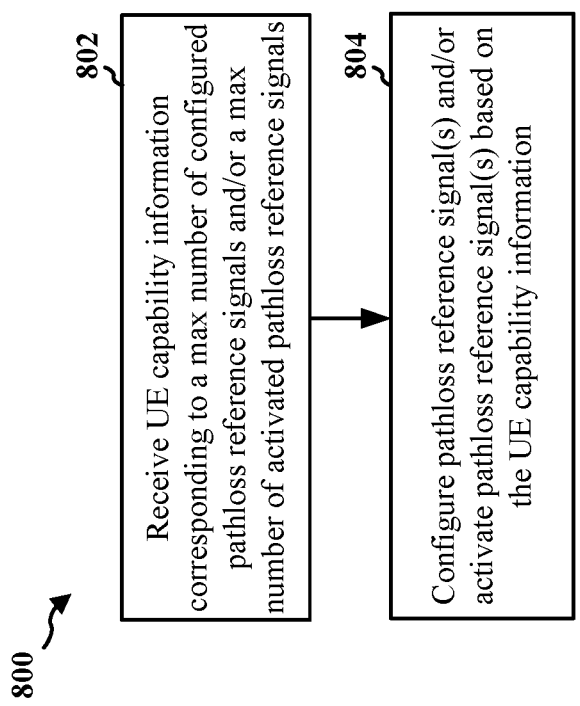
FIG. 8 is a flowchart of a method of wireless communication.

FIG. 8 is a flowchart 800 of a method of wireless communication. The method may be performed by a base station or a component of a base station (e.g., the base station 102, 180, 310, 404; the apparatus 902/1002; the baseband unit 1004, which may include the memory 376 and which may be the entire base station 310 or a component of the base station 310, such as the TX processor 316, the RX processor 370, and/or the controller/processor 375). The method may help the base station to configure the UE for pathloss reference signals and/or activate pathloss reference signals for the UE that are within the UE's capability.

At 802, the base station receives, from a UE, UE capability information for a first maximum number of configured pathloss reference signals and/or a second maximum number of activated pathloss reference signals. The reception may be performed, e.g., by the capability component 908 of the apparatus 902 in FIG. 9. The second maximum number of activated pathloss reference signals may be equal to or less than the first maximum number of configured pathloss reference signals. The UE capability information for the first maximum number of configured pathloss reference signals or the second maximum number of activated pathloss reference signals may correspond to pathloss reference signals that the UE uses for power control of one or more uplink signals or uplink channels, such as a PUSCH, a PUCCH, and/or an SRS.

For example, the UE capability information may be for a particular type of uplink transmission or a type of uplink channel. The UE capability information may be for the pathloss reference signals that the UE uses to perform power control of a single uplink signal or a single uplink channel. Alternatively, the UE capability information may apply to power control for each uplink signal from the UE or for each uplink channel from the UE.

At 804, the base station configures the UE for at least one of a third number of configured pathloss reference signals and/or a fourth number of activated pathloss reference signals based on the UE capability information. The configuration may be performed, e.g., by the configuration component 910 of the apparatus 902 in FIG. 9. For example, the UE capability information for the first maximum number of configured pathloss reference signals or the second maximum number of activated pathloss reference signals may correspond to pathloss reference signals that the UE uses for power control of one or more uplink signals or uplink channels, and, at 804, the base station may provide the UE with a power control configuration that includes at least one of the third number of configured pathloss reference signals or the fourth number of activated pathloss reference signals based on the UE capability. As another example, the UE capability information for the first maximum number of configured pathloss reference signals or the second maximum number of activated pathloss reference signals may correspond to pathloss reference signals that the UE uses for power control of a single uplink signal or a single uplink channel, and, at 804, the base station may provide the UE with a power control configuration for the single uplink signal or the single uplink channel that includes at least one of the third number of configured pathloss reference signals or the fourth number of activated pathloss reference signals based on the UE capability information. The single uplink channel may be a PUSCH, PUCCH, or an SRS, for example.

The UE capability information may include the first maximum number of configured pathloss reference signals, and the base station may limit the third number of configured pathloss reference signals to no more than the first maximum number of configured pathloss reference signals from the UE capability. The UE capability information may include the second maximum number of activated pathloss reference signals, and the base station may limit the fourth number of activated pathloss reference signals to no more than the second maximum number of activated pathloss reference signals from the UE capability information. The pathloss reference signals may be configured via RRC signaling from the base station. The pathloss reference signal(s) may be activated via a MAC-CE from the base station.

Figure 9:
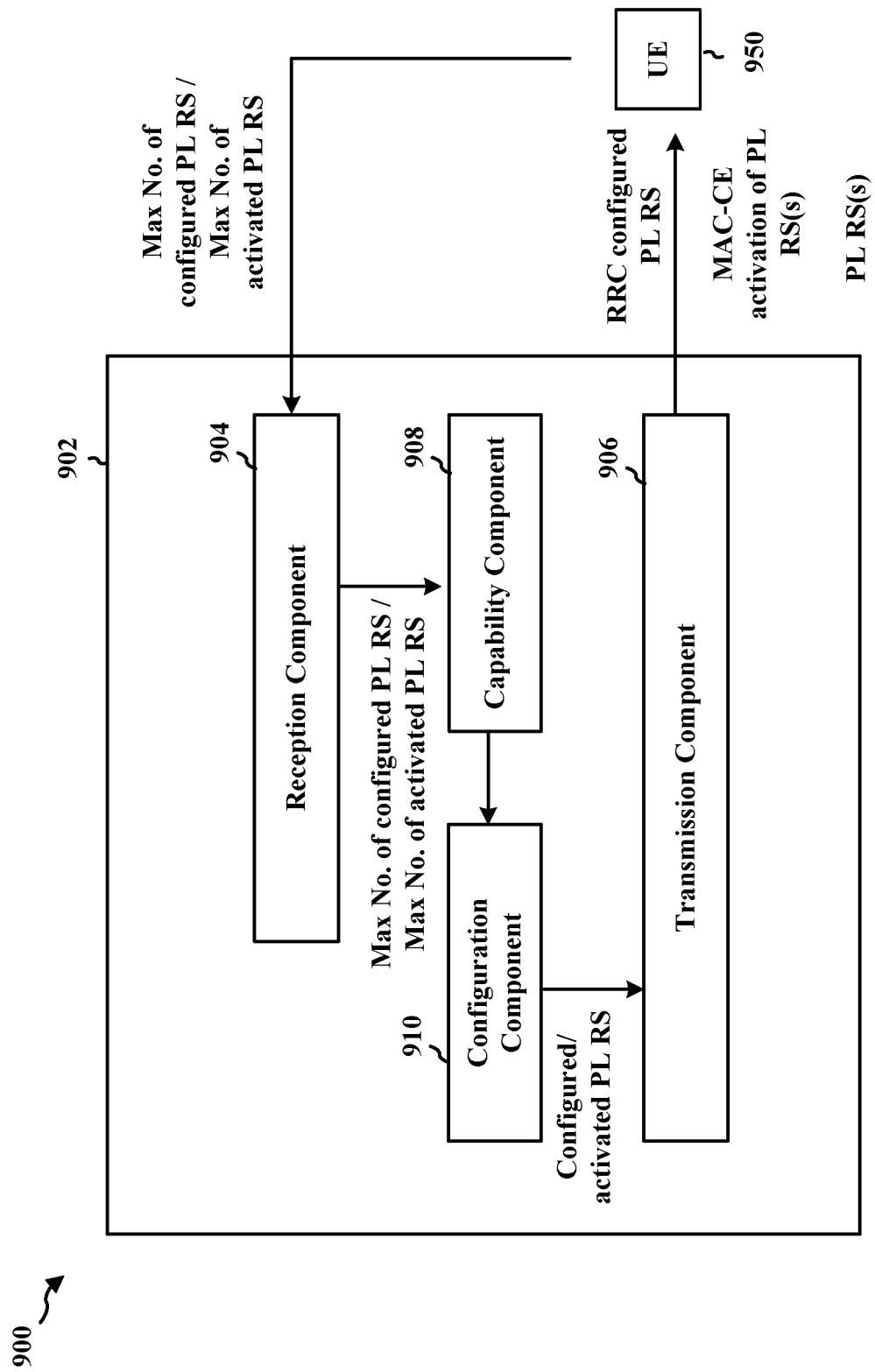
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a base station or a component of a base station. The apparatus includes a reception component 904 configured to receive uplink communication from a UE 950 and a transmission component 906 configured to transmit downlink communication to the UE 950. The apparatus includes a capability component 908 configured to receive from a UE, UE capability information that corresponds to a first maximum number of configured pathloss reference signals and/or a second maximum number of activated pathloss reference signals, e.g., as described in connection with 802 in FIG. 8. The apparatus includes a configuration component 910 configured to configure the UE for at least one of a third number of configured pathloss reference signals and/or a fourth number of activated pathloss reference signals based on the UE capability information, e.g., as described in connection with 804 in FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
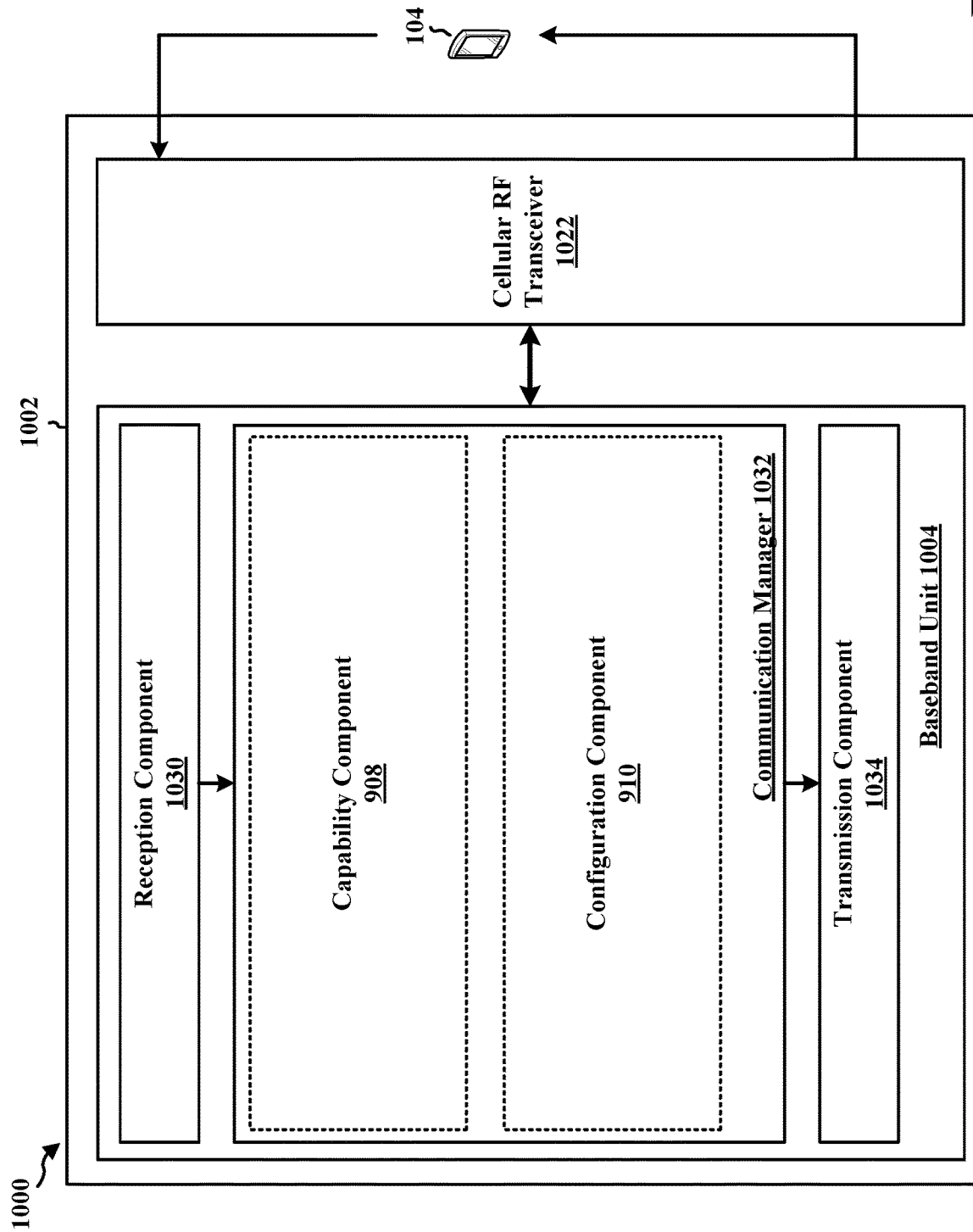
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a capability component 908 that is configured to receive from a UE, a UE capability for a first maximum number of configured pathloss reference signals and/or a second maximum number of activated pathloss reference signals, e.g., as described in connection with 802 in FIG. 8. The communication manager 1032 further includes a configuration component 910 that is configured to configure the UE for at least one of a third number of configured pathloss reference signals and/or a fourth number of activated pathloss reference signals based on the UE capability, e.g., as described in connection with 804 in FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902/1002, and in particular the baseband unit 1004, includes means for receiving, receives, from a UE, a UE capability for a first maximum number of configured pathloss reference signals and/or a second maximum number of activated pathloss reference signals. The apparatus may include means for configuring the UE for at least one of a third number of configured pathloss reference signals and/or a fourth number of activated pathloss reference signals based on the UE capability. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: transmitting, to a base station, UE capability information corresponding to at least one of a first maximum number of configured pathloss reference signals or a second maximum number of activated pathloss reference signals; and receiving a configuration from the base station for at least one of configured pathloss reference signals or activated pathloss reference signals based on the UE capability.

In aspect 2, the method of aspect 1 further includes that the UE capability information comprises the first maximum number of configured pathloss reference signals.

In aspect 3, the method of aspect 1 further includes that the UE capability information comprises the second maximum number of activated pathloss reference signals.

In aspect 4, the method of aspect 1 further includes that the UE capability comprises the first maximum number of configured pathloss reference signals and the second maximum number of activated pathloss reference signals.

In aspect 5, the method of any of aspects 1-4 further includes that the second maximum number of activated pathloss reference signals is equal to or less than the first maximum number of configured pathloss reference signals.

In aspect 6, the method of any of aspects 1-5 further includes that the UE capability information for the first maximum number of configured pathloss reference signals or the second maximum number of activated pathloss reference signals corresponds to pathloss reference signals that the UE uses for power control of one or more uplink signals or uplink channels, the method further comprising: measuring a pathloss of the activated pathloss reference signals that are configured based on the UE capability; and determining a transmit power for the one or more uplink signals or uplink channels based on the pathloss.

In aspect 7, the method of aspect 6 further includes that the UE capability information for the first maximum number of configured pathloss reference signals or the second maximum number of activated pathloss reference signals corresponds to pathloss reference signals that the UE uses for power control of a single uplink signal or a single uplink channel, and wherein the UE determines the transmit power for the single uplink signal or the single uplink channel based on the pathloss of the activated pathloss reference signals that are configured based on the UE capability.

In aspect 8, the method of aspect 7 further includes that the single uplink channel includes one of a PUSCH, a PUCCH, or an SRS.

In aspect 9, the method of aspect 6 further includes that the UE capability information for the first maximum number of configured pathloss reference signals or the second maximum number of activated pathloss reference signals corresponds to pathloss reference signals that the UE uses for power control for each uplink signal or for each uplink channel from the UE, and wherein the UE determines the transmit power for each uplink signal or each uplink channel based on the pathloss of the activated pathloss reference signals that are configured based on the UE capability Aspect 10 is an apparatus for wireless communication including at least one processor coupled to a memory and configured to implement a method as in any of aspects 1 to 9.

Aspect 11 is an apparatus for wireless communication including means for implementing a method as in any of aspects 1 to 9.

Aspect 12 is a non-transitory computer-readable medium storing computer executable code, where the code when executed by a processor causes the processor to implement a method as in any of aspects 1 to 9.

Aspect 13 is a method of wireless communication at a base station, comprising:

receiving, from a UE, UE capability information corresponding to at least one of a first maximum number of configured pathloss reference signals or a second maximum number of activated pathloss reference signals; and configuring the UE for at least one of a third number of configured pathloss reference signals or a fourth number of activated pathloss reference signals based on the UE capability.

In aspect 14, the method of aspect 13 further includes that the UE capability information comprises the first maximum number of configured pathloss reference signals, and wherein the base station limits the third number of configured pathloss reference signals to no more than the first maximum number of configured pathloss reference signals from the UE capability.

In aspect 15, the method of aspect 13 further includes that the UE capability information comprises the second maximum number of activated pathloss reference signals, and wherein the base station limits the fourth number of activated pathloss reference signals to no more than the second maximum number of activated pathloss reference signals from the UE capability.

In aspect 16, the method of aspect 13 further includes that the UE capability information comprises the first maximum number of configured pathloss reference signals and the second maximum number of activated pathloss reference signals, wherein the base station limits the third number of configured pathloss reference signals to no more than the first maximum number of configured pathloss reference signals from the UE capability, and wherein the base station limits the fourth number of activated pathloss reference signals to no more than the second maximum number of activated pathloss reference signals from the UE capability.

In aspect 17, the method of any of aspects 13-16 further includes that the second maximum number of activated pathloss reference signals is equal to or less than the first maximum number of configured pathloss reference signals.

In aspect 18, the method of any of aspects 13-17 further includes that the UE capability information for the first maximum number of configured pathloss reference signals or the second maximum number of activated pathloss reference signals corresponds to pathloss reference signals that the UE uses for power control of one or more uplink signals or uplink channels, and wherein the base station provides the UE with a power control configuration that includes at least one of the third number of configured pathloss reference signals or the fourth number of activated pathloss reference signals based on the UE capability.

In aspect 19, the method of aspect 18 further includes that the UE capability information for the first maximum number of configured pathloss reference signals or the second maximum number of activated pathloss reference signals corresponds to pathloss reference signals that the UE uses for power control of a single uplink signal or a single uplink channel, and wherein the base station provides the UE with a power control configuration for the single uplink signal or the single uplink channel that includes at least one of the third number of configured pathloss reference signals or the fourth number of activated pathloss reference signals based on the UE capability.

In aspect 20, the method of aspect 19 further includes that the single uplink channel is one of a PUSCH, a PUCCH, or an SRS.

In aspect 21, the method of aspect 18 further includes that the UE capability information for the first maximum number of configured pathloss reference signals or the second maximum number of activated pathloss reference signals corresponds to pathloss reference signals that the UE uses for power control for each uplink signal or each uplink channel from the UE, and wherein the base station provides the UE with a power control configuration for each uplink signal or each uplink channel that includes at least one of the third number of configured pathloss reference signals or the fourth number of activated pathloss reference signals based on the UE capability.

Aspect 22 is an apparatus for wireless communication including at least one processor coupled to a memory and configured to implement a method as in any of aspects 13 to 21.

Aspect 23 is an apparatus for wireless communication including means for implementing a method as in any of aspects 13 to 21.

Aspect 24 is a computer-readable medium storing computer executable code, where the code when executed by a processor causes the processor to implement a method as in any of aspects 13 to 21.

What is claimed is:

1. A method of wireless communication at a user equipment (UE), comprising:
   transmitting, to a base station, UE capability information corresponding to at least one of a first maximum number of configured pathloss reference signals or a second maximum number of activated pathloss reference signals, the UE capability information being associated with UE capability for performing layer 3 (L3) filtering of one or more activated pathloss reference signals; and
   receiving a configuration from the base station for at least one of configured pathloss reference signals or activated pathloss reference signals based on the UE capability information, wherein the activated pathloss reference signals are associated with at least one sounding reference signal (SRS) resource set.

2. The method of claim 1, wherein the UE capability information comprises the first maximum number of configured pathloss reference signals.

3. The method of claim 1, wherein the UE capability information comprises the second maximum number of activated pathloss reference signals.

4. The method of claim 1, wherein the UE capability information comprises the first maximum number of configured pathloss reference signals and the second maximum number of activated pathloss reference signals.

5. The method of claim 4, wherein the second maximum number of activated pathloss reference signals is equal to or less than the first maximum number of configured pathloss reference signals.

6. The method of claim 1, wherein the UE capability information for the first maximum number of configured pathloss reference signals or the second maximum number of activated pathloss reference signals corresponds to pathloss reference signals that the UE uses for power control of one or more uplink signals or uplink channels, the method further comprising:
   measuring a pathloss of the activated pathloss reference signals that are configured based on the UE capability information; and determining a transmit power for the one or more uplink signals or uplink channels based on the pathloss.

7. The method of claim 6, wherein the UE capability information for the first maximum number of configured pathloss reference signals or the second maximum number of activated pathloss reference signals corresponds to the pathloss reference signals that the UE uses for the power control of a single uplink signal or a single uplink channel, and wherein the UE determines the transmit power for the single uplink signal or the single uplink channel based on the pathloss of the activated pathloss reference signals that are configured based on the UE capability information.

8. The method of claim 7, wherein the single uplink channel includes one of a physical uplink shared channel (PUSCH), a physical uplink control channel (PUCCH), or a sounding reference signal (SRS).

9. The method of claim 6, wherein the UE capability information for the first maximum number of configured pathloss reference signals or the second maximum number of activated pathloss reference signals corresponds to the pathloss reference signals that the UE uses for the power control for each uplink signal or for each uplink channel from the UE, and wherein the UE determines the transmit power for each uplink signal or each uplink channel based on the pathloss of the activated pathloss reference signals that are configured based on the UE capability information.

10. A method of wireless communication at a base station, comprising:

receiving, from a user equipment (UE), UE capability information corresponding to at least one of a first maximum number of configured pathloss reference signals or a second maximum number of activated pathloss reference signals, the UE capability information being associated with UE capability for performing layer 3 (L3) filtering of one or more activated pathloss reference signals; and configuring the UE for at least one of a third number of configured pathloss reference signals or a fourth number of activated pathloss reference signals based on the UE capability information, wherein the fourth number of activated pathloss reference signals are associated with at least one sounding reference signal (SRS) resource set.

11. The method of claim 10, wherein the UE capability information comprises the first maximum number of configured pathloss reference signals, and wherein the base station limits the third number of configured pathloss reference signals to no more than the first maximum number of configured pathloss reference signals from the UE capability information.

12. The method of claim 10, wherein the UE capability information comprises the second maximum number of activated pathloss reference signals, and wherein the base station limits the fourth number of activated pathloss reference signals to no more than the second maximum number of activated pathloss reference signals from the UE capability information.

13. The method of claim 10, wherein the UE capability information comprises the first maximum number of configured pathloss reference signals and the second maximum number of activated pathloss reference signals, wherein the base station limits the third number of configured pathloss reference signals to no more than the first maximum number of configured pathloss reference signals from the UE capability information, and wherein the base station limits the fourth number of activated pathloss reference signals to no more than the second maximum number of activated pathloss reference signals from the UE capability information.

14. The method of claim 13, wherein the second maximum number of activated pathloss reference signals is equal to or less than the first maximum number of configured pathloss reference signals.

15. The method of claim 10, wherein the UE capability information for the first maximum number of configured pathloss reference signals or the second maximum number of activated pathloss reference signals corresponds to pathloss reference signals that the UE uses for power control of one or more uplink signals or uplink channels, and wherein the base station provides the UE with a power control configuration that includes at least one of the third number of configured pathloss reference signals or the fourth number of activated pathloss reference signals based on the UE capability information.

16. The method of claim 15, wherein the UE capability information for the first maximum number of configured pathloss reference signals or the second maximum number of activated pathloss reference signals corresponds to the pathloss reference signals that the UE uses for the power control of a single uplink signal or a single uplink channel, and wherein the base station provides the UE with the power control configuration for the single uplink signal or the single uplink channel that includes at least one of the third number of configured pathloss reference signals or the fourth number of activated pathloss reference signals based on the UE capability information.

17. The method of claim 16, wherein the single uplink channel is one of a physical uplink shared channel (PUSCH), a physical uplink control channel (PUCCH), or a sounding reference signal (SRS).

18. The method of claim 15, wherein the UE capability information for the first maximum number of configured pathloss reference signals or the second maximum number of activated pathloss reference signals corresponds to the pathloss reference signals that the UE uses for the power control for each uplink signal or each uplink channel from the UE, and wherein the base station provides the UE with the power control configuration for each uplink signal or each uplink channel that includes at least one of the third number of configured pathloss reference signals or the fourth number of activated pathloss reference signals based on the UE capability information.

19. An apparatus for wireless communication at a user equipment (UE), comprising:

a memory; and at least one processor coupled to the memory and configured to:

transmit, to a base station, UE capability information that corresponds to at least one of a first maximum number of configured pathloss reference signals or a second maximum number of activated pathloss reference signals, the UE capability information being associated with UE capability for performing layer 3 (L3) filtering of one or more activated pathloss reference signals; and receive a configuration from the base station for at least one of configured pathloss reference signals or activated pathloss reference signals based on the UE capability information, wherein the activated pathloss reference signals are associated with at least one sounding reference signal (SRS) resource set.

20. The apparatus of claim 19, wherein the UE capability information comprises the first maximum number of configured pathloss reference signals.

21. The apparatus of claim 19, wherein the UE capability information comprises the second maximum number of activated pathloss reference signals.

22. The apparatus of claim 19, wherein the UE capability information comprises the first maximum number of configured pathloss reference signals and the second maximum number of activated pathloss reference signals.

23. The apparatus of claim 22, wherein the second maximum number of activated pathloss reference signals is equal to or less than the first maximum number of configured pathloss reference signals.

24. The apparatus of claim 19, wherein the UE capability information for the first maximum number of configured pathloss reference signals or the second maximum number of activated pathloss reference signals corresponds to pathloss reference signals that the UE uses for power control of one or more uplink signals or uplink channels, the at least one processor being further configured to:
   measure a pathloss of the activated pathloss reference signals that are configured based on the UE capability information; and
   determine a transmit power for the one or more uplink signals or uplink channels based on the pathloss.

25. The apparatus of claim 24, wherein the UE capability information for the first maximum number of configured pathloss reference signals or the second maximum number of activated pathloss reference signals corresponds to the pathloss reference signals that the UE uses for the power control of a single uplink signal or a single uplink channel, and
   wherein the apparatus determines the transmit power for the single uplink signal or the single uplink channel based on the pathloss of the activated pathloss reference signals that are configured based on the UE capability information.

26. The apparatus of claim 25, wherein the single uplink channel includes at least one of a physical uplink shared channel (PUSCH), a physical uplink control channel (PUCCH), or a sounding reference signal (SRS).

27. An apparatus for wireless communication at a base station, comprising:
   a memory; and
   at least one processor coupled to the memory and configured to:
      receive, from a user equipment (UE), UE capability information that corresponds to at least one of a first maximum number of configured pathloss reference signals or a second maximum number of activated pathloss reference signals, the UE capability information being associated with UE capability for performing layer 3 (L3) filtering of one or more activated pathloss reference signals; and
      configure the UE for at least one of a third number of configured pathloss reference signals or a fourth number of activated pathloss reference signals based on the UE capability information, wherein the fourth number of activated pathloss reference signals are associated with at least one sounding reference signal (SRS) resource set.

28. The apparatus of claim 27, wherein the UE capability information comprises the first maximum number of configured pathloss reference signals.

29. The apparatus of claim 27, wherein the UE capability information comprises the second maximum number of activated pathloss reference signals.

30. The apparatus of claim 27, wherein the UE capability information comprises the first maximum number of configured pathloss reference signals and the second maximum number of activated pathloss reference signals,
   wherein the apparatus limits the third number of configured pathloss reference signals to no more than the first maximum number of configured pathloss reference signals from the UE capability information, and
   wherein the apparatus limits the fourth number of activated pathloss reference signals to no more than the second maximum number of activated pathloss reference signals from the UE capability information.

* * * * *